Dec. 12, 1961     H. S. HAWKINS     3,012,304
MACHINE TOOL CARRIAGE LOCKING MEANS
Filed Oct. 28, 1957     3 Sheets-Sheet 2
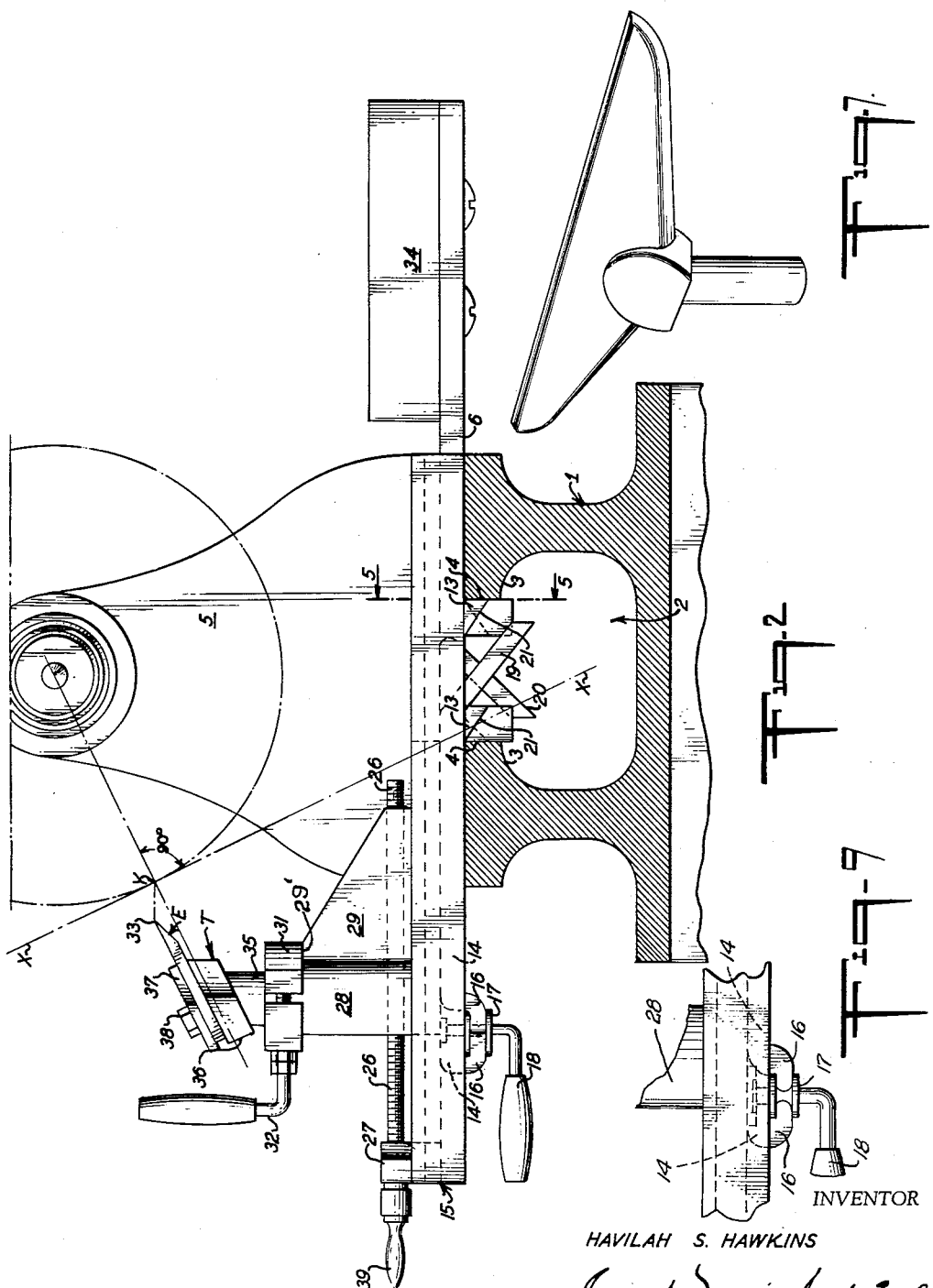
INVENTOR
HAVILAH S. HAWKINS
BY
ATTORNEY

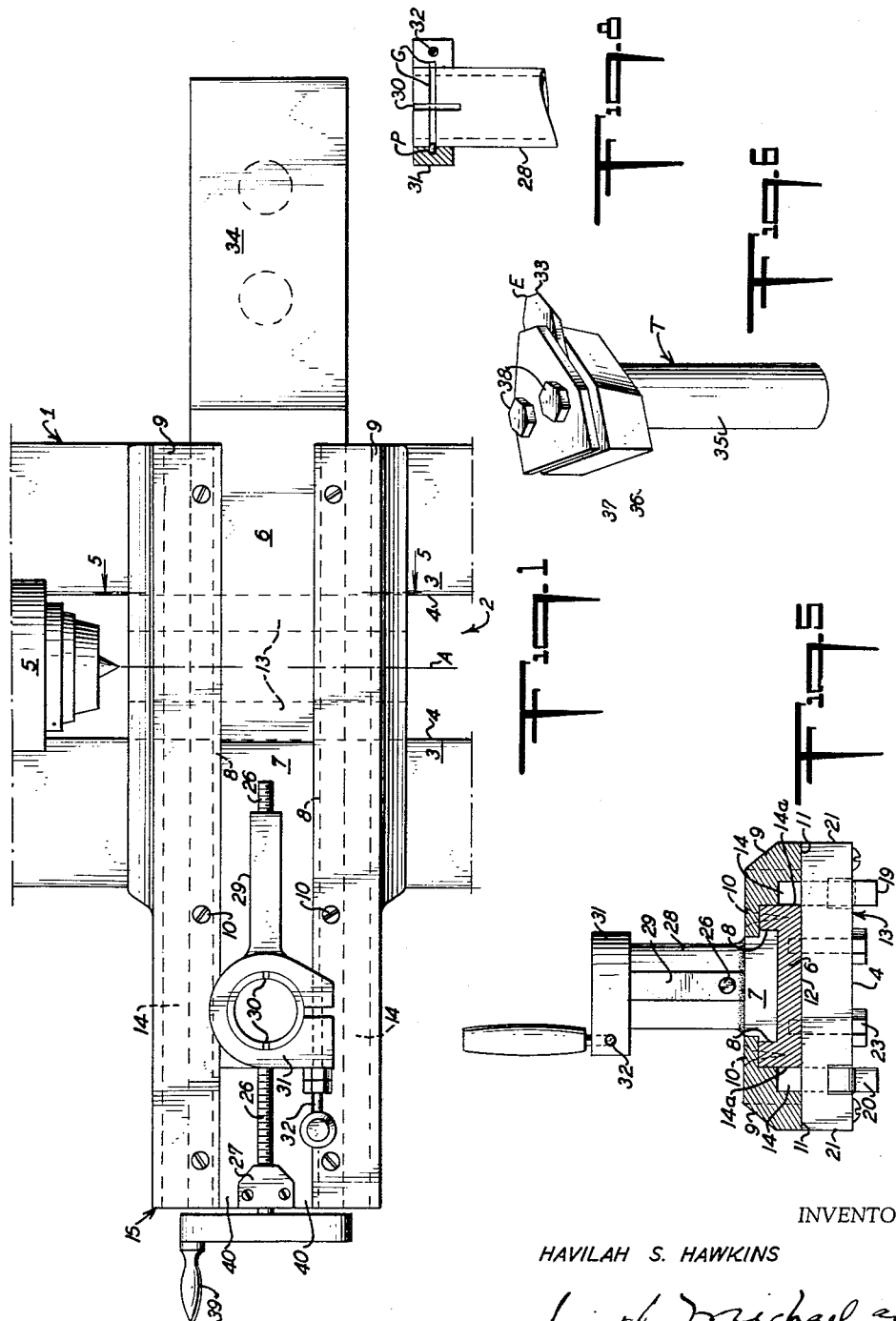

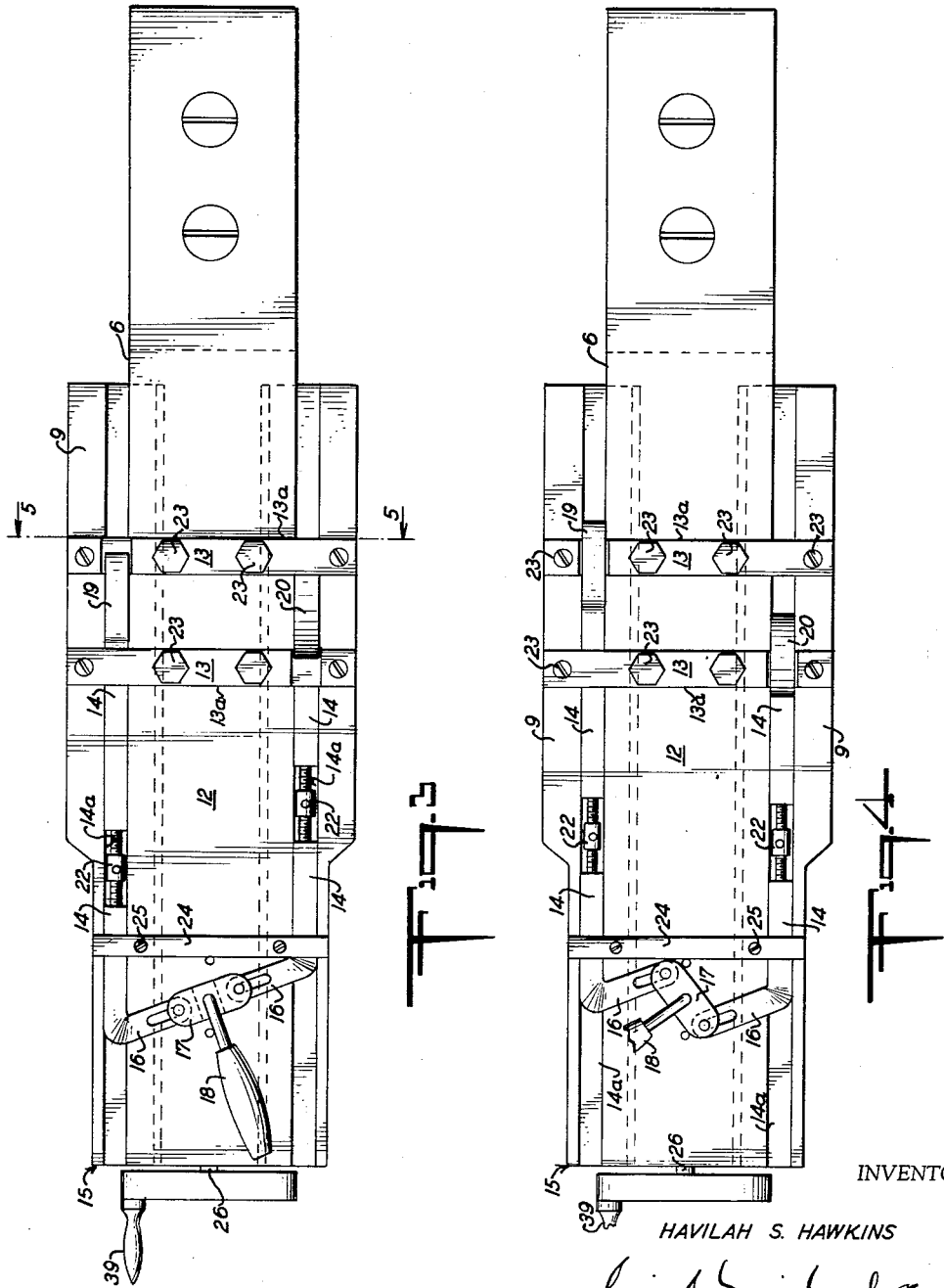

United States Patent Office 3,012,304
Patented Dec. 12, 1961

3,012,304
MACHINE TOOL CARRIAGE LOCKING MEANS
Havilah S. Hawkins, Sedgwick, Maine
Filed Oct. 28, 1957, Ser. No. 692,812
7 Claims. (Cl. 29—1)

This invention relates generally to turning lathes and more particularly to a tool carriage for use in connection with such lathes.

One object of the invention is to provide a novel tool carriage of minimum vertical height designed to be freely supported on the bed frame of the lathe for longitudinal sliding movement thereon, together with a novel cutting tool so disposed with respect to the work being operated upon that the forces developed by such operations are delivered to the lathe bed in a manner which eliminates the necessity for anchoring or fixedly securing the tool carriage to the lathe bed as is now required by conventional tool carriage and tool design.

A further object of the invention is to distribute the weight of the carriage and tool support carried thereby so as to substantially eliminate any tendency of the tool carriage to tilt about an axis parallel to the work axis when the lathe is in operation.

Another object of the invention is to provide in a tool carriage of the character described, guide means cooperable with a longitudinal slot in the bed frame of a lathe, so as to guide the carriage accurately with respect to the work when the carriage is slidingly moved longitudinally along the bed frame manually and without the necessity of connection to a conventional carriage feed screw.

Another object of the invention is to provide novel means for releasably locking the carriage to the bed frame of a lathe at any desired point within the range of permissible longitudinal sliding movement of the tool carriage thereon between the headstock and the tailstock of the lathe.

Another object of the invention is to provide in a tool carriage of the character described, novel tool support means, together with means for moving the same longitudinally of the carriage and transversely with respect to the work axis of the lathe.

Another object of the invention is to provide a tool carriage of the character described having a split hollow tool post designed to receive interchangeably the shank of a tool or of a tool rest, together with a split clamping collar rotatably mounted on the tool post for adjustment to desired positions angularly of the post axis.

These and other objects of the invention will become apparent from the following specification when read in the light of the accompanying drawings, wherein is illustrated a preferred embodiment of the invention and wherein:

FIG. 1 is a plan view of a part of a lathe with the tool carriage in operative position thereon;

FIG. 2 is a sectional view taken on the line 2—2 of FIG. 1;

FIG. 3 is a bottom plan view of the tool carriage with the locking mechanism in released position;

FIG. 4 is a bottom plan view of the tool carriage with the locking mechanism in locked position;

FIG. 5 is a sectional view taken on the line 5—5 of FIG. 1;

FIG. 6 is a perspective view of one form of tool designed for use with the tool carriage;

FIG. 7 is a detail sectional view of the clamping collar and split hollow tool post;

FIG. 8 is a perspective view of a conventional chisel rest;

FIG. 9 is a fragmental detail view showing the pivotal mounting of the link 17.

Referring more particularly to the accompanying drawing wherein like reference numerals are used to designate like parts throughout, FIG. 1 shows the tool carriage of the present invention mounted in operative position on the bed frame 1 of a lathe of conventional construction. The bed frame 1 of the lathe is provided with a longitudinally extending slot 2 which, as shown in FIG. 2, is defined in part by longitudinally extending shoulder portions 3—3, the latter presenting opposed, spaced parallel wall portions 4—4. The slot 2 extends substantially throughout the bed frame of the lathe and between the headstock 5 and the tailstock (not shown). The upper surface of the bed frame comprising the upper surfaces of the shoulder portions 3—3 is substantially coplanar and provides a smooth surface on which the tool carriage of the present invention may be supported for longitudinal sliding movement. The tool carriage as shown in FIG. 1 comprises a base member 6 upon which is slidingly mounted a tool support member 7. The tool support 7 is guided for longitudinal sliding movement on the base member 6 by upstanding edge flanges 8—8 carried by the base member 6, as shown in FIG. 5. Furthermore, the base member 6 carries wing portions 9—9, which may be integral with or secured to each of the edge flanges 8—8 as shown, by suitable bolts or screws 10. The wing members 9 at their inner edges overhang the space between the guide flanges 8—8 of the base member as shown in FIG. 5 and snugly engage the upper surface of the tool support 7, whereby to confine the tool support member 7 therein for accurate sliding movement toward and away from the work axis of the lathe, as will presently appear.

The under surface portions 11 of the wing portions 9 are disposed in substantially coplanar relation to the under surface 12 of the base member 6 jointly to provide a supporting surface for the tool carriage which slidingly engages the upper coplanar surface of the bed frame of the lathe 1. Guide means in the form of transverse bars 13 are secured to the under surface 12 of the base member 6, the bars 13 being disposed in generally parallel relation to each other and transversely of the base 6 of the tool carriage and are dimensioned to fit snugly within the longitudinal slot 2 of the bed frame with the outer side faces 13a of said bars in sliding contact with the walls 4—4 of said slot, in order to guide accurately the tool carriage in its sliding movement longitudinally of the bed frame.

The tool carriage is provided with means for releasably locking it in any desired position within the permissible range of sliding movement thereof when desired or when necessary, and such means includes longitudinally movable bolt members 14 mounted for sliding movement on or within the tool carriage. The bolt members 14 are received within guideways 14a formed in the tool carriage by open grooves cut into the lower surface of the wing members 9 as shown in FIG. 5. The bolt members 14 extend to a point near the front end 15 of the tool carriage where they are bent inwardly towards each other as shown in FIGS. 3 and 4 and the adjacent terminal portions 16 thereof are bent down and under the base 6 and are connected together by a linkage or toggle mechanism, including a link 17 pivotally connected intermediate its ends to the underside of the tool carriage 6 and pivotally connected at its opposite ends to the slotted adjacent terminal portions 16 of the bolt members 14. The pivotal link block 17 is provided with an actuating handle 18 by which the link block may be turned on its pivotal axis. By this arrangement it is evident that movement of the operating handle to swing the link 17 in opposite directions about its pivot will simultaneously move the bolt members 14 within their respective guides, but in opposite directions. The opposite ends of the respective bolt members 14—14 are provided with downwardly bent locking hook portions 19 and 20 as shown more clearly in FIG. 2, the hook portion 19 being directed away from the operating handle 18 and the hook portion 20 being directed towards the operating handle 18. Thus, as shown in FIG. 2, the hook portions 19 and 20 of the bolt members 14 are moved into underlying locking engagement with the shoulder portions 3—3 of the bed frame when the handle 18 is actuated. The hook portions 19 and 20 normally depend from the base member 6 between the guide bars 13—13 as shown, and the guide bars are notched or cut away as shown at 21 to accommodate the hook portions 19 and 20 of the bolt members as the latter are moved into locking position underlying the adjacent shoulder 3—3. In order to adjust the bolt members 14 as to length, so that the hook members 19 and 20 may properly move to underlying locking engagement with the shoulder portions 3—3 of the bed frame, the bolt members may be sectionalized as shown in FIGS. 3 and 4 and the sections interconnected by oppositely threaded portions of turn buckles 22 of conventional construction. It will be understood that rotation of the turn buckles in opposite directions will tend to lengthen or shorten the overall dimension of the respective bolt members as desired.

The guide bars 13 may be secured to the underside of the tool carriage 6 in any convenient manner such as by bolts 23. As thus arranged, the bars function to retain the bolt members 14—14 within their respective guideways 14a—14a and an additional bar 24 may be provided, if desired, to assist in confining the forward end portions of the bolt members 14—14 within their respective guideways, said bar 24 overlying the guideways 14a and being secured to the under face 12 of the tool carriage 6 by bolt or screw members 25.

The tool support 7 may be moved longitudinally of the tool carriage by any conventional means such as a screw-threaded rod 26 mounted for rotation in a journal block 27 carried by the upper face of the tool carriage 6 near its forward end 15 as clearly shown in FIG. 1. The threaded rod 26 extends through and is threadedly connected to a hollow tool post 28 secured to the tool support by welding, as shown, and the hollow tool post may be strengthened by a conventional generally triangular gusset plate 29, if desired. The tool post 28 may be slotted longitudinally as at 30 and a split clamping collar 31 surrounds the slotted portion of the post to secure therein the shank of a suitable tool T, shown more clearly in FIG. 6, when the ends of the clamping collar 31 are actuated by the conventional screw and handle 32. It should be noted that the clamping collar 31 is mounted upon the tool post 28 for rotation with respect thereto, whereby the clamping screw and handle unit 32 may be disposed in any convenient position angularly about the axis of the tool post 28, to avoid interference between the handle and a work piece in the lathe when certain operations are being performed, such as cutting the left-hand end of a large diameter work piece. The clamping collar 31 may be supported in proper position on the post 28 by the shoulder 29' on the gusset 29, or if desired, the collar and the tool post may be provided with cooperating means such as pin P and a groove G to retain the clamping collar 31 in proper position longitudinally of the tool post 28, while permitting the desired relative rotary movement therebetween (see FIG. 7).

As shown in FIG. 2, the tool T when in operation is disposed at a height such that when moved into contact with the work piece W at the point Y, the tool lies in an upwardly inclined plane passing through the axis of the work piece thus directing the cutting thrust towards the bed of the lathe along the line X—X. Furthermore, in order substantially to eliminate any tendency of the tool carriage to tilt about an axis parallel to the work axis A when in use, the tool carriage 6 is provided at its rear end with a suitable counterweight 34, it being noted that this counterweight is positioned to effectively offset any downwardly directed forces operating upon the tool carriage incident to a cutting operation on a work piece by the tool T.

The tool T comprises a shank portion 35 provided with a cutter supporting head 36 at its upper end, said head being disposed at a substantial angle to the axis of the shank, as shown. A cutter element E is secured to the head 36 by any convenient means, such as a clamping plate 37 secured in firm contact with the cutting element E by a plurality of screws 38 threadedly engaged with the tool supporting head 36.

In operation it will be understood that the tool carriage of my invention is mounted upon the upper coplanar surface of a conventional lathe bed frame having a longitudinally extending slot 2, with the guide bars 13—13 entered within such slot and with the surfaces 13a—13a thereof in snug sliding engagement with the opposed parallel substantially vertical wall surfaces 4—4 of said slot, as shown in FIG. 2. When so mounted, the hook portions 19 and 20 of the bolt members 14—14 depend from the tool carriage between the guide bars 13—13 as shown in FIG. 2. The tool carriage, under these circumstances, may be manually moved accurately longitudinally of the lathe between the headstock and the tailstock thereof to manipulate a tool T carried by the tool post 28, operatively with respect to a work piece W mounted in the lathe. The tool support 7 may be moved toward and from the work axis by rotating the threaded shaft 26 by means of the handle 39. It will be noted in connection with the operating mechanism for the tool support that the journal block 27 is of lesser transverse dimension than the space between the wing portions 9—9 to provide spaces 40 through which chips from the work piece, which accumulate on the base member 6 during operation, may be removed or discharged.

It will be understood that the operation of the tool carriage of the present invention as thus described contemplates accurate longitudinal movement of a tool with reference to a work piece by manually sliding the tool carriage carrying the tool, along the bed frame of the lathe and without the aid of a power driven feed screw connection between the tool carriage and the lathe mechanism. However, if desired, such as when performing an operation which may develop a thrust longitudinally of the work axis, the tool carriage may be releasably secured in any position within the range of its sliding movement by operating the handle 18 to move hook members 19 and 20 into locking underlying relation with the shoulder portions 3—3 of the bed frame. In lieu of the tool T, a tool or chisel rest such as shown in FIG. 8 may be mounted within the hollow tool post 28. A lathe tool of any desired conventional form may then be manually operated with respect to the work piece by resting the tool on such conventional support.

Having thus described my invention, it is apparent that I have provided a novel tool carriage of minimum vertical height designed for manual sliding movement on the bed frame of a lathe, with no mechanical feed connection with a driven feed screw. The tool carriage may be releasably secured in any desired position of longitudinal adjustment by a hand-operated locking mechanism engageable with the side walls of the guide slot. A tool support is provided for longitudinal sliding movement on the tool carriage below the axis of work rotation, the tool support being designed and arranged to support a cutting tool at an upwardly inclined angle and at a height such that when the tool engages the work, the plane of the cutter passes substantially through the axis of work rotation. This arrangement insures that the forces incident to a cutting operation are directed downwardly into the bed of the lathe. By adjusting the height of the cutter as the diameter of the work varies, this relationship of forces may be substantially maintained. Furthermore, the disposition of the tool support and the counter- weight on opposite sides of the axis of work rotation tend to counterbalance or offset any tendency of the tool carriage to tilt incident to forces resulting from turning operations. It will be understood that the embodiment of the invention illustrated in the drawings is but for the purpose of illustration only and those skilled in the art will appreciate that various changes in the size and arrangement of parts as shown may be made without departing from the spirit of the invention which is defined more clearly in the appended claims.

I claim:

1. Carriage locking means comprising in combination with a slidable tool carriage, a machine frame on which the tool carriage is slidably mounted, said machine frame having an elongated guide slot having opposite parallel side walls in the elongated direction, said tool carriage including a base member slidably engaging said machine frame on opposite sides of said slot and provided with spaced parallel guide means extending transversely to the elongated direction of said slot and parallel with the slidably engaging portion of said base member, a bolt member mounted in each of said guide means for sliding lengthwise movement therein, each of said bolt members carrying at one end thereof a clamping portion disposed within said slot and means on the tool carriage and operatively connected to the bolt members for reciprocating the bolt members within their respective guide means simultaneously in opposite directions to engage and disengage the respective clamping portions of the bolt members with the opposite side walls of the slot.

2. The apparatus described in claim 1 wherein the base member of the tool carriage is provided with carriage guide means depending therefrom and disposed within said slot in free sliding engagement with the walls of said slot.

3. The apparatus described in claim 1 wherein the means for slidably reciprocating the bolt members includes means interconnecting the bolt members for longitudinal sliding movement in opposite directions, and wherein the clamping portions of the respective bolt members comprise hook shaped portions projecting downwardly into the slot in the machine frame and movable transversely of said slot in opposite directions to releasably clamp the opposite wall portions of the slot when the bolt members are reciprocated within their respective guide means.

4. The apparatus described in claim 1 wherein the means for slidably reciprocating the bolt members includes toggle linkage mechanism operatively interconnecting the bolt members for simultaneous reciprocation in opposite direction, the clamping portions of the bolt members including hook shaped portions projecting downwardly into the slot in the machine frame and movable transversely of said slot in opposite directions to releasably clamp the opposite wall portions of the slot when the bolt members are reciprocated within their respective guide means.

5. The apparatus described in claim 1 wherein the bolt members each comprise plural sections connected in end-to-end relation by a turnbuckle member, said turnbuckle members being disposed within and sliding freely within the respective guide means for the bolts.

6. The apparatus described in claim 1 wherein the bolt guide means comprises longitudinally extending grooves formed in the base member, said bolt members being seated in said grooves, and means retaining the bolt members within said grooves for longitudinal sliding movement therein.

7. The apparatus described in claim 4 wherein the pivotally mounted linkage mechanism includes a link member pivotally mounted intermediate its ends on the base member between the bolt members, means connecting opposite ends of said link member to the respective bolt members, and means for rocking said link member about its pivotal mounting.

References Cited in the file of this patent

UNITED STATES PATENTS

| | | |
|---|---|---|
| 291,398 | Putnam | Jan. 1, 1884 |
| 370,331 | Hamilton | Sept. 20, 1887 |
| 432,515 | Dederick | July 22, 1890 |
| 1,018,525 | Smith | Feb. 27, 1912 |
| 1,127,890 | Hjorth | Feb. 9, 1915 |
| 1,258,136 | Needham | Mar. 5, 1918 |
| 1,469,226 | Langhammer | Oct. 2, 1923 |
| 1,670,540 | Humphreys | May 22, 1928 |
| 1,935,753 | Talboys | Nov. 21, 1933 |
| 2,048,107 | Collins | July 21, 1936 |
| 2,356,517 | Hale | Aug. 22, 1944 |
| 2,393,696 | Kraut | Jan. 29, 1946 |
| 2,486,075 | Strom | Oct. 25, 1949 |
| 2,577,517 | Gallimore | Dec. 4, 1951 |
| 2,697,456 | Goldschmidt | Dec. 21, 1954 |
| 2,788,564 | Waldrich | Apr. 16, 1957 |
| 2,831,237 | Bannow | Apr. 22, 1958 |